United States Patent [19]

Zechner et al.

[11] Patent Number: 4,859,440
[45] Date of Patent: Aug. 22, 1989

[54] METHOD OF TREATING FLUE GASES AND COMBUSTION RESIDUES

[75] Inventors: Franz Zechner, Vienna; Josef Stubenvoll, Poysdorf, both of Austria

[73] Assignee: Simmering-Graz-Pauker Aktiengeselschaft, Vienna, Austria

[21] Appl. No.: 233,039

[22] Filed: Aug. 17, 1988

[30] Foreign Application Priority Data

Aug. 18, 1987 [AT] Austria ................................. 2079/87

[51] Int. Cl.$^4$ .......................... C01B 7/00; C01B 17/00
[52] U.S. Cl. ...................................... 423/240; 423/242
[58] Field of Search ............... 423/242 R, 242 A, 210, 423/240 R

[56] References Cited

U.S. PATENT DOCUMENTS

| | | | |
|---|---|---|---|
| 4,002,724 | 1/1977 | Mokie | 423/242 |
| 4,138,231 | 2/1979 | Hedenas et al. | 423/210 |
| 4,164,547 | 8/1979 | Simko | 423/242 |
| 4,228,139 | 10/1980 | Johnson | 423/242 |
| 4,369,167 | 1/1983 | Weir | 423/210 |

FOREIGN PATENT DOCUMENTS 396969  8/1933  United Kingdom ................ 423/242

Primary Examiner—Gregory A. Heller
Attorney, Agent, or Firm—Fleit, Jacobson, Cohn, Price, Holman & Stern

[57] ABSTRACT

The alkalinity of the solids, slag and ash, which occur in a combustion plant such as an incinerator is utilized for the flue gas scrubber, while at the same time the storability and the alkaline flue gas washing stage are improved. For this purpose, the scrubbing liquor is removed from the tank of a flue gas scrubber for $SO_2$, so that it can be used for the separate scrubbing of slag and ash in, for example, stirrer vessels. Subsequently, the slag is separated in a sieve according to particle size, and the fine portion, together with the ash, is supplied to a dewatering stage, from which they pass to a stirrer vessel, in order to be re-washed there with scrubbing liquor from tank emanating from a flue gas scrubber for HCl. In a subsequent washing stage, the solids are freed of chlorides. The scrubbing liquor from the dewatering stage is returned to the tank, while the scrubbing liquor from the settling tank is returned to another tank. To separate mercury and the other heavy metals, additional stages are provided.

2 Claims, 12 Drawing Sheets

METHOD OF TREATING FLUE GASES AND COMBUSTION RESIDUES

The present invention relates to a method of treating flue gases and combustion residues produced in a combustion plant such as a waste incinerator. In particular, the present invention relates to a method which comprises filtering the flue ash and at least one subsequent treatment step for wet-scrubbing the flue gas, in which the alkalinity of the combustion residues is used for eluting the acidic components of the flue gas.

BACKGROUND OF THE INVENTION AND PRIOR ART DISCUSSION

At the present time, it is no longer a problem to minimize the emission into the atmosphere from a waste incinerator, so that environmental pollution is negligible. To free flue gases from their pollutants, efficient flue gas cleaning plants are known which employ three basic processes; a wet process, a semi-dry process and a dry process. The wet process produces a particularly high degree of cleaning, but necessitates a relatively high expenditure in terms of investment, energy and chemicals.

It is known, from U.S. Pat. No. 4,164,547, to utilise the alkaliniy of flue ash in order to neutralize acidic flue gases. In such a case, flue ash is added, together with calcium oxide or sodium carbonate, to the washing fluid of a flue gas cleaning plant, so that the proportion of chemicals added thereto can be reduced. Efforts are also being made to improve the storage properties.

For the refuse slag, that is to say, for the residues remaining on the hearth or bed of the incinerator, a single wash is generally considered to be sufficient for the removal of easily soluble components, so that they can then be utilised further in, for example, the construction industry. Further processing, such as sieving, may be necessary to achieve this.

Several methods are known for improving the storage properties of the flue ash. In some of them, an additive, such as cement is mixed with the flue ash to cause it to solidify, Hardening of the mixture is achieved by the binding thereof with water. In consequence, a reduced leachability is also achieved. One disadvantage of these methods (except in the Bamberg model) is that an increase in the volume required for the storage thereof is necessitated.

A further possibility of storage is to provide individual containers, however, this is only an interim solution because, in the course of time, even the best container will corrode and the reactivity of the flue ash then reappears.

It is known to treat the flue ash with an acidic solution whereby easily elutable elements, such as cadmium and zinc, can be removed. The ash is then pelleted and re-combusted, whereby organic substances are destroyed and the ash develops properties similar to the slag.

OBJECTS OF THE INVENTION

The present invention seeks to provide a method which is generally of the above-described type, but in which the addition of chemicals to the wet-scrubbing is minimized.

Furthermore, the present invention seeks to provide a method which optimizes the storage properties of the slag and ash and makes it possible to remove heavy metals from the ash and slag in a simple manner.

SUMMARY OF THE INVENTION

According to the invention, a first method of the initially described type is characterized in that the resultant combustion residues, in the form of ash and/or slag, are subjected to at least a first wash and to at least a subsequent second wash, whereby the scrubbing liquor for the first washing stage is removed from the tank of a flue gas scrubber at a pH value of from 3 to 8, to which scrubber it is returned from the first wash at a pH value of from 5 to 12 for eluting the acidic constituents of the flue gases in the circuit, and the scrubbing liquor for the second washing stage is removed from the tank of a flue gas scrubber at a pH value of from 0.5 to 4, to which scrubber it is returned from the second wash at a pH value of from 1 to 7 for eluting the acidic constituents of the flue gases in the circuit.

According to the invention, a second method of the initially described type is characterized in that the resultant combustion residues in the form of ash and/or slag are subjected to at least one wash, whereby the scrubbing liquor is removed from the tank of a flue gas scrubber at a pH value of from 3 to 8, to which scrubber it is returned from the wash at a pH value of from 5 to 12 for eluting the acidic constituents of the flue gases in the circuit.

According to the invention, a third method of the initially described type is characterized in that the resultant combustion residues in the form of ash and/or slag are subjected to at least one wash, whereby the scrubbing liquor is removed from the tank of a flue gas scrubber at a pH value of from 0.5 to 4, to which scrubber it is returned from the wash at a pH value of from 1 to 7 for eluting the acidic constituents of the flue gases in the circuit.

The invention presents the following, substantial advantages:

(a) The costs are reduced since, at worst, only a minimal quantity of additional chemicals are required to achieve neutralisation.

(b) The storage behaviour of the slag and ash is improved by the leaching of the easily soluble substances therefrom.

(c) The alkaline circulation water reacts with sulphur dioxide without the formation of solids; high supersaturations are avoided due to the constant separation in the solids wash.

(d) Because the circulation waters do not contain solids, there are no problems with abrasion in the scrubbers.

BRIEF DESCRIPTION OF THE DRAWINGS

The invention will be further described, by way of example, with reference to the accompanying drawings, in which.

DESCRIPTION OF PREFERRED EMBODIMENTS

Figure 1:
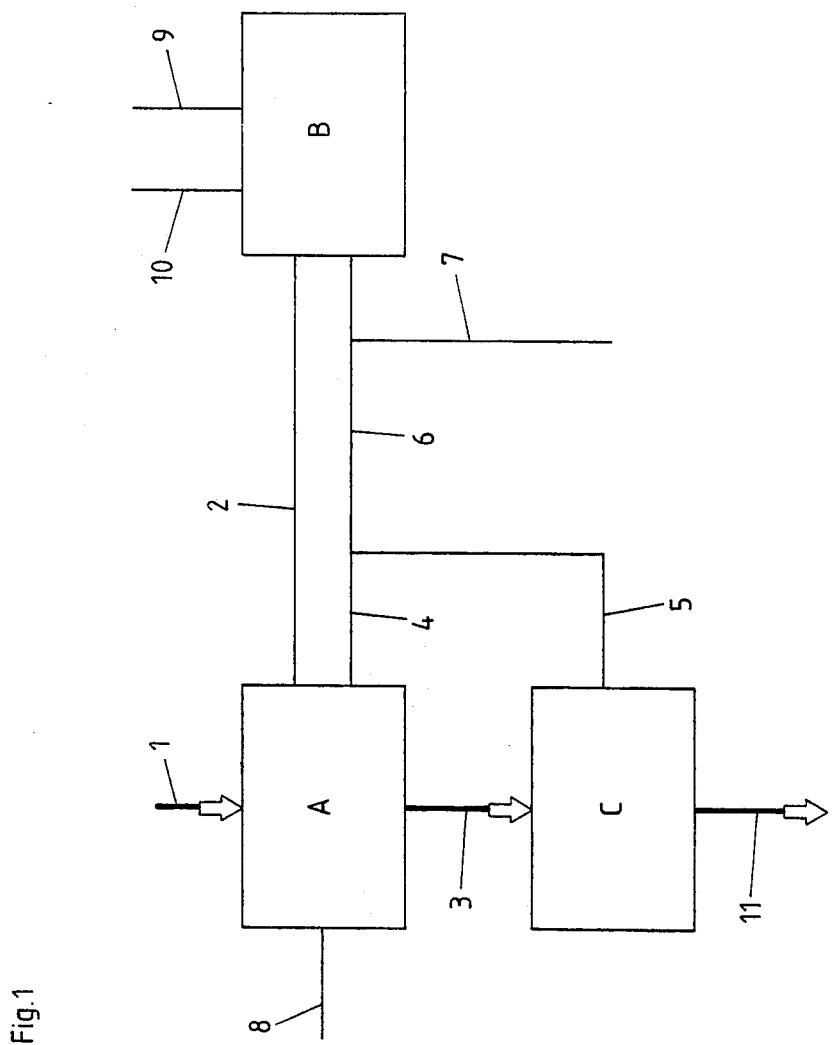
FIGS. 1 to 4 are block diagrams of alkaline washes for ash and slag.

FIG. 1 shows a block diagram of the simplest form of an alkaline wash system for ash and slag which is used in conjunction with the second flue gas scrubber of a two-stage flue gas wet scrubbing system. Ash and slag are jointly supplied as stream 1, to a first washing stage A such as a stirred vessel either with or without an attached settling tank or a modified wet de-slagger. In stage A, the ash and slag are brought into contact with a circulatory water stream 2 emanating from tank B which forms part of a second flue gas scrubber. From tank A, a part-stream 3, which is rich in solids, passes to a dewatering unit C such as a decanter, centrifuge, presse, sieve drum or the like. The easily soluble components of the ash and slag dissolve in the washing stage A and the part-stream 4 thereof leaving the washing stage A, after combination with the part-stream 5 produced in the dewatering unit C, produces an alkaline stream 6 which can be used for the removal or absorption of the acidic constituents of the flue gases in the second flue gas scrubber. The alkalinity of the stream 6 is due to the alkalinity of the ash and slag, which is returned to tank B. A portion of stream 6 is removed, as stream 7, prior to reaching tank B and is conducted to a waste water processor (not shown). This is to prevent chlorides and other easily soluble substances from becoming enriched in the circuit. To compensate for the water losses produced by the removal of stream 7, fresh water may be supplied to washing stage A in the form of stream 8. Streams 9 and 10 denote the supply and return of the scrubbing liquor passing from tank B into the second flue gas scrubber. The base-forming ions there, as for example Ca, Na and K, give rise to the removal of $SO_2$. Thereby hydrogensulfates and sulfates are formed, which are transported to A via stream 2, where they are deposited onto the solids as gypsum. The dewatered solids pass, as a stream 11, from the dewatering unit C to an acidic washing stage, which will be described hereinafter.

Figure 2:
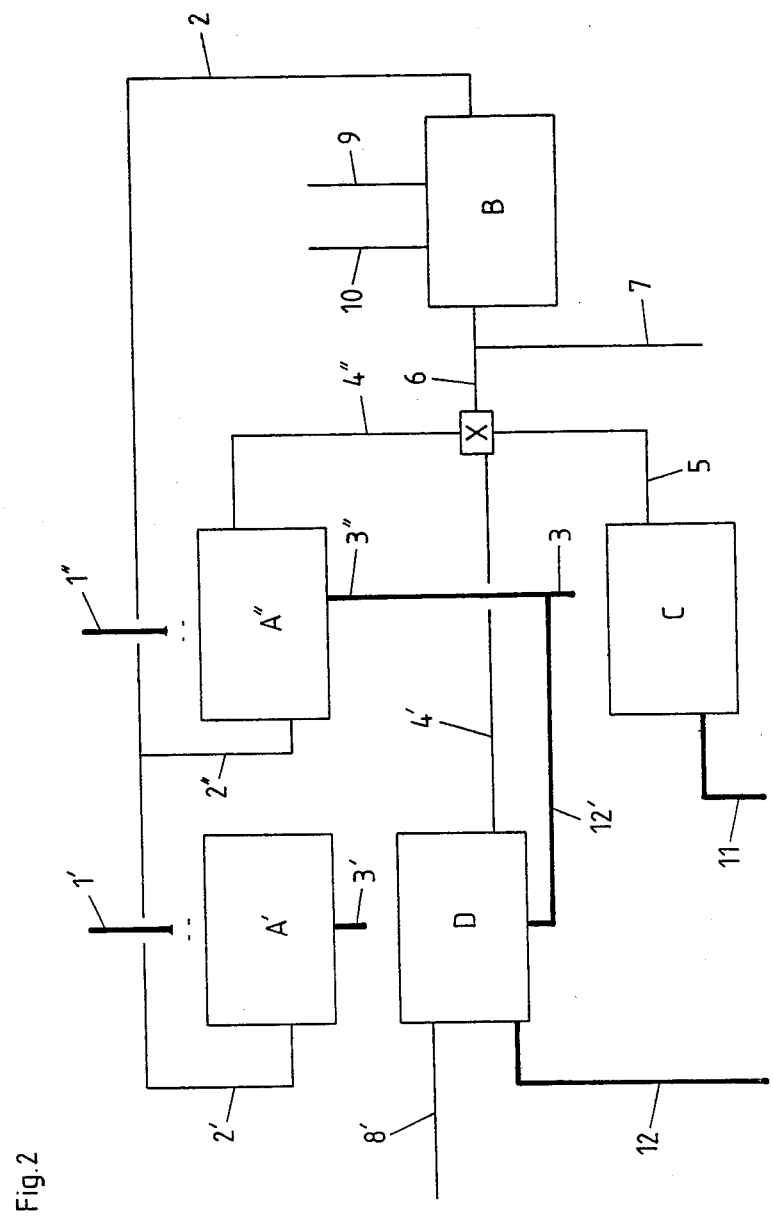

FIG. 2 shows separate alkaline washing stages for the ash and the slag. The separate washing stages have the advantage that the coarse slag, which is minimally contaminated with pollutants, does not, in such circumstances, come in contact with the more highly contaminated ash. The slag is supplied to washing stage A' as stream 1', while the ash is supplied to washing stage A'' as stream 1''. The scrubbing liquor of the second flue gas scrubber is conducted away from tank B in the form of a stream 2 which is subsequently divided into part-streams 2',2'' for supply to the washing stages A' and A'' respectively. The solids produced in washing stage A' pass, as stream 3', to a sieve D, where the separation of the slag is effected according to particle size. The coarse fraction thus produced is subsequently washed with fresh water by a stream 8' and is separated out as stream 12 which is not treated in subsequent acidic washing stage. The fine fraction forms a stream 12' which is combined with the stream 3'' produced by the washing of the ash in stage A''. The combined stream 3 thus produced is conducted to the dewatering unit C. The dewatered solids produced in unit C emerge therefrom as stream 11 and are transferred to an acidic washing stage. The alkaline wash waters from washing stage A'', sieve D and dewatering unit C pass as stream 4'', 4' and 5 respectively to a collection vessel such as a storage tank or reservoir X and emerge therefrom as stream 6 to be returned to tank B. The separated supply of the alkaline streams 4', 4'' and 5 to tank B, instead of a combined stream, would also be possible. The streams 7,9 and 10 are identical in function to the identically numbered streams described with reference to FIG. 1.

Figure 3:
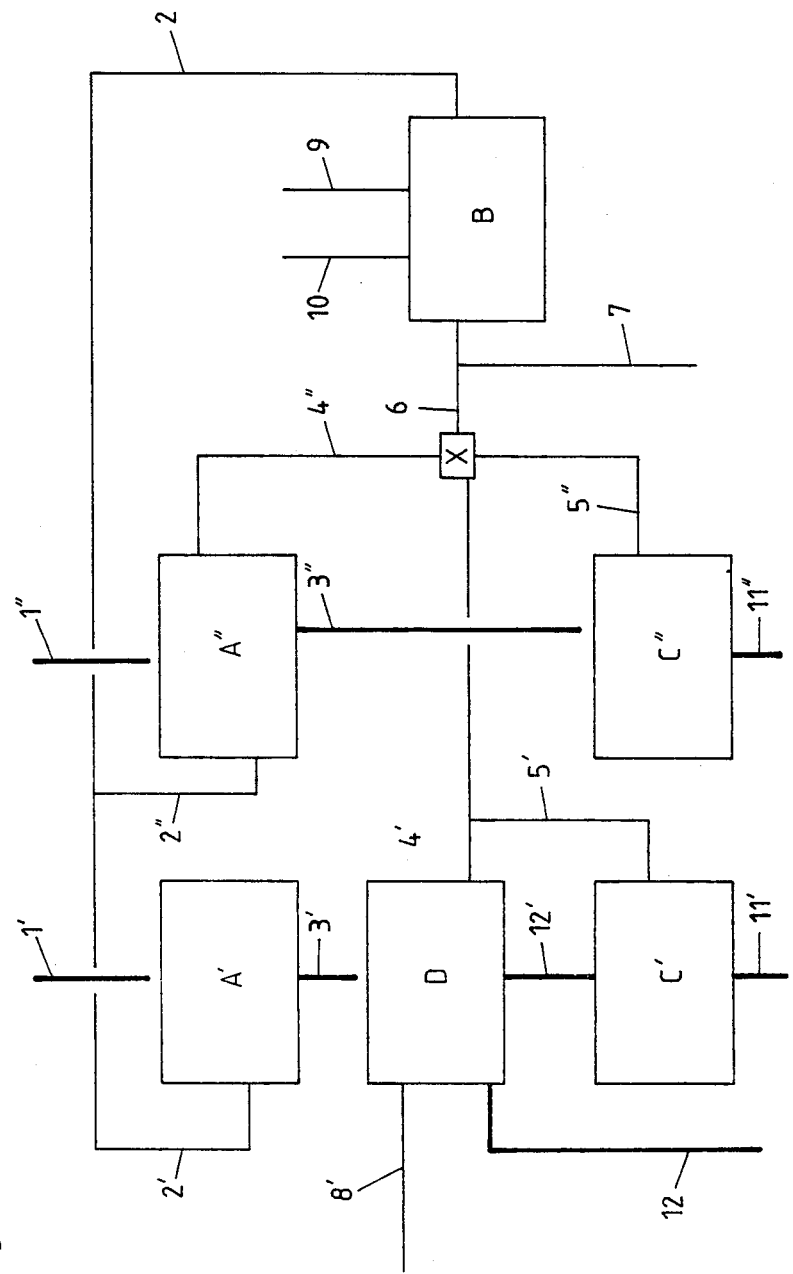

FIG. 3 shows an arrangement similar to that shown in FIG. 2, but introduces the possibility of separate dewatering of slag and ash in separate dewatering units C' and C''. In such arrangement the alkaline stream 4' from the sieve D used for separating the slag according to its particle size is combined with alkaline stream 5' from a dewatering unit C' used for dewatering the slag and is conducted to a collection vessel X, to which the alkaline stream 5'' and 4'' emanating, respectively, from the washing stage A'' and the dewatering unit C'' for the ash, are also conducted. The solids of slag and ash are separately available as streams 11' and 11'' respectively, and can be further treated in separate acidic washing stages, as will be described hereinafter.

Figure 4:
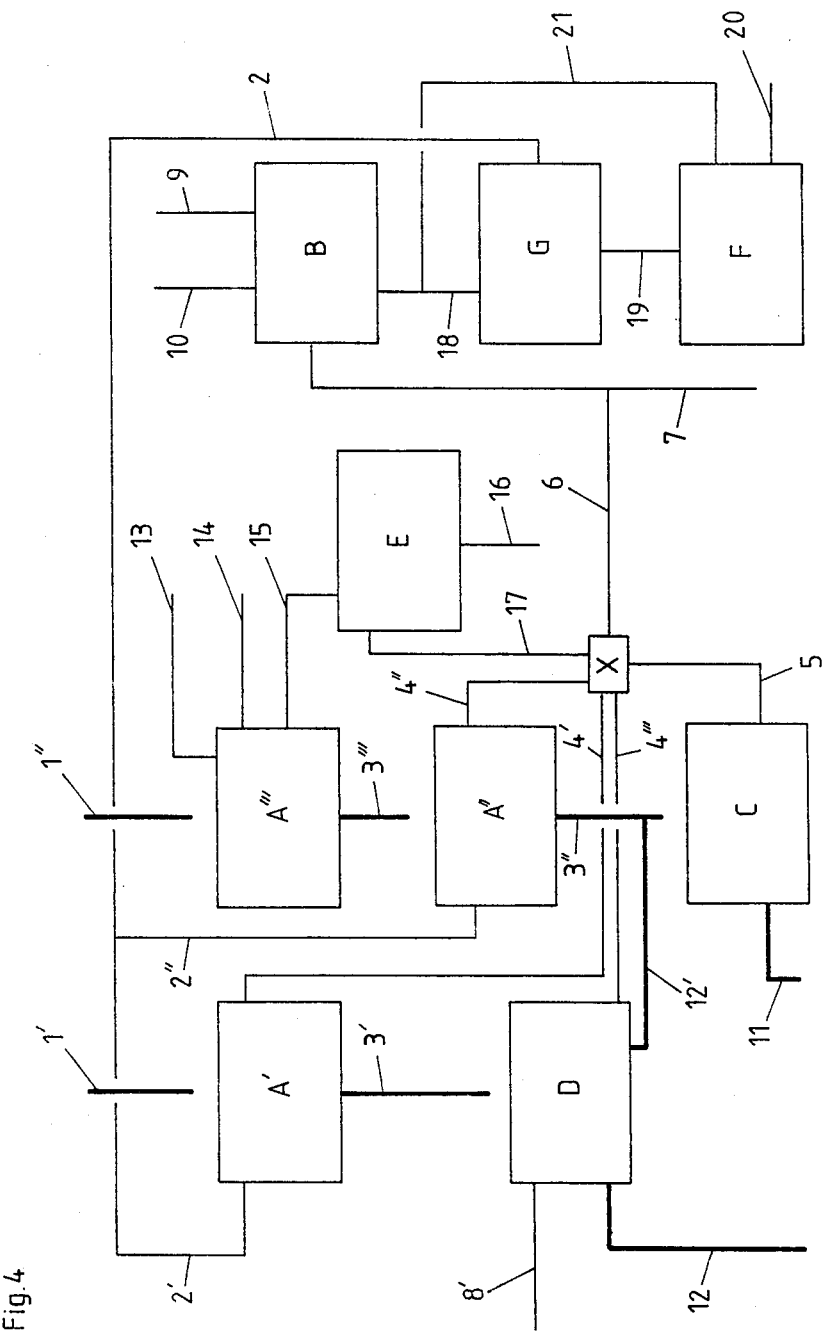

FIG. 4 shows a plurality of possible additional treatment stages which may be included in the embodiment shown in FIG. 2.

Thus, firstly, an additional stream 4' may be conducted away from the washing stage A' and supplied to a collecting vessel X. This provides an additional settling possibility in washing stage A' for the slag after contact with the circulating water. Sieve D, therefore, which serves as the separation stage, is less heavily loaded.

Alternatively or additionally, a further washing stage A''' may be provided upstream of the washing stage A''. The ash is supplied to such stage A''' as a stream 1'''. Water, as stream 13, and a sodium hydroxide solution, as stream 14, are additionally supplied to stage A'' in order to achieve such a high pH value therein. This causes heavy metals in the ash dissolve as complex ions which are then separated from the aqueous solution. The washing lye thus produced passes, as stream 15, to a heavy metal separation stage, such as an ion exchanger E, and purged of heavy metals so that a stream 16, rich in heavy metals, can be discharged from the system and a stream 17, which has a low concentration of heavy metals, can be supplied to the collecting vessel X together with the other alkaline streams 4',4'', 4''' and 5.

A reverse osmosis stage G may be necessary if a separate gypsum separation is to be effected or if, due to the high ion concentration, the leaching-out of the slag and the ash is difficult to achieve. In such a case, the stream from tank B is numbered 18 and is fed to the reverse osmosis stage G. The purified stream 2 produced therein is then introduced into the alkaline washes, and an intensely charged stream 19 which may either serve as the feed stream 19 for a gypsum separation stage F (to be described hereinafter) or, may be supplied to a waste water processor.

As in conventional flue gas desulphurization plants, a gypsum separation is possible. The scrubbing liquor is conducted from tank B, as stream 18, to the inverse osmosis stage G as described above and the highly concentrated stream 19 is fed to a gypsum separation stage F, shown only in block form. In a hydrocyclone, the coarse gypsum crystals are moved by using a thickener and a vacuum filter. The crystals discharged as stream 20. The water, which has been purified of the coarse gypsum crystals, passes, as stream 21, to the stream 18 upstream of the reverse osmosis stage G. In this variant, the circulation water to be supplied to the washing stage A' and A" is removed, a stream 2, from the inverse osmosis stage G.

If no gypsum separation stage F is provided, the gypsum is deposited in the ash and slag, due to the displacement of the pH value, the high Ca ion concentration and the large solids surface available.

If too few alkaline substances for the separation are eliminated, additional alkaline chemicals may be supplied to the tank. This applies to all four of the above-described variations. Moreover, with the exception of the gypsum separation stage, the other three variations may be effected in combination with any of the others or independently thereof.

Before describing the acidic washing stages shown in FIGS. 5 to 8, the purpose and mode of operation of the individual blocks appearing in these Figures will be described.

BLOCKS H, H', H"

The actual acidic washing of the solids is effected in these blocks, in that the solids are mixed with the acidic scrubbing liquor and soluble substances, particularly alkali metal and alkaline earth metal ions are released into the scrubbing liquor. These soluble substances are subsequently separated from the scrubbing liquor. This has two advantageous effects.

Firstly, because, the alkaline substances dissolve, over-acidification of the washing watercycle is prevented. Secondly the heavy metals are mobilised by the low pH value and pass into the scrubbing liquor. They can then be separated in an individual stage, whereby the refinement of the remaining residues is ensured. For example, such a stage may be designed as a stirrer vessel with a settling tank provided at the outlet end thereof. If the acidic constituents of the flue gases are insufficient to obtain a sufficiently low pH value necessary for the elution of the heavy metals, additional acidic chemicals may be added (not shown).

BLOCK I

This is the tank of the first flue gas scrubber, which is used, in particular, for the separation of HCl, so that the scrubbing liquor which is introduced into the wash stage, stream 31 needs to be only weakly acidic in order to effect separation. The scrubbing liquor not only scrubs the flue gases, but it also serves to cool them, so that the amount of scrubbing liquor, stream 32, which returns to the tank, is less due to evaporation. In consequence, additional scrubbing liquor from the acidic scrubbing liquor circuit is supplied by streams 26 and 40 which then returns to the circuit as stream 27.

BLOCK K

Block K is a mercury separation stage. In the first scrubber, not only the HCl (and the flue dust charged with heavy metals) is removed but also the majority of any mercury present. The mercury must be separated out prior to contact with the solids since, otherwise, it would be absorbed thereon. For this purpose, the stream 27 entering separator K from tank I, is subjected to a specific precipitation, for example, with TMT 15 or is conducted through specific mercury ion exchangers, so that the scrubbing liquor leaving the separator K in the form of stream 28 is, for the most part, mercury-free. Moreover, a stream 33 is also produced which is rich in mercury and from which the mercury can be recovered if need be.

BLOCK L

Block L is a heavy metal separation stage. For removal of the heavy metals which are in solution, a method as specific as possible should be employed so as to make the recovery economically viable and/or produce the minimum possible amount of refuse requiring special measures for the disposal thereof.

Some possible methods which may be employed to this end are:

(a) Specific extraction utilizing an organic phase and re-extraction thereof with acid. The concentrated acidic metal-containing solution emerges from block L as stream 35 and can be reprocessed or neutralised, the metals contained therein being precipitated.

(b) Specific extraction utilizing an organic phase and stepwise re-extraction thereof with acid. This causes the production of a plurality of acidic solutions having differing compositions. These multiple streams are, for the sake of clarity, shown as a single stream 35.

(c) Specific extraction utilizing an organic phase and the subsequent re-extraction thereof with a concentrated alkaline solution. The stream 35 will, in such a case, be in the form of a metal hydroxide-containing sludge.

(d) Fluid membrane permeation wherein extraction and re-extraction take place in a container. In such a process, three phases form a multiple emulsion, the central organic phase serving as a membrane. The stream 35 is, in such a case, a concentrated acidic metal-containing solution.

(e) Ion-exchange utilizing specific resins in which the stream 35 comprises the metal bound to the resin.

If methods (a) to (d) are carried out, it is initially necessary to purify the scrubbing liquor initially to ensure that no solids pollute the organic phase. Subsequently the water has to be freed from organic substances.

BLOCKS M, M', M"

These blocks represent the necessary subsequent acid washing stages and are used to free the solids from chlorides carried along with the residual water from the first acidic washing stage H. Fresh water is introduced into such stages as a stream 36 is also used to replace water losses from the circulatory system resulting from the discharge (stream 34) to the waste water processor from the heavy metal separation stage, which latter is necessary to prevent enrichment of the water with soluble materials, and also that which evaporates during the cooling of the flue gases.

BLOCK N

Block N is a reverse osmosis stage which is included when the normal function of the circuit is detrimentally affected by high salt concentrations. Such a stage is used in the embodiment shown in FIG. 7 but, in principle, it may also be included in the other embodiments.

Figure 5:
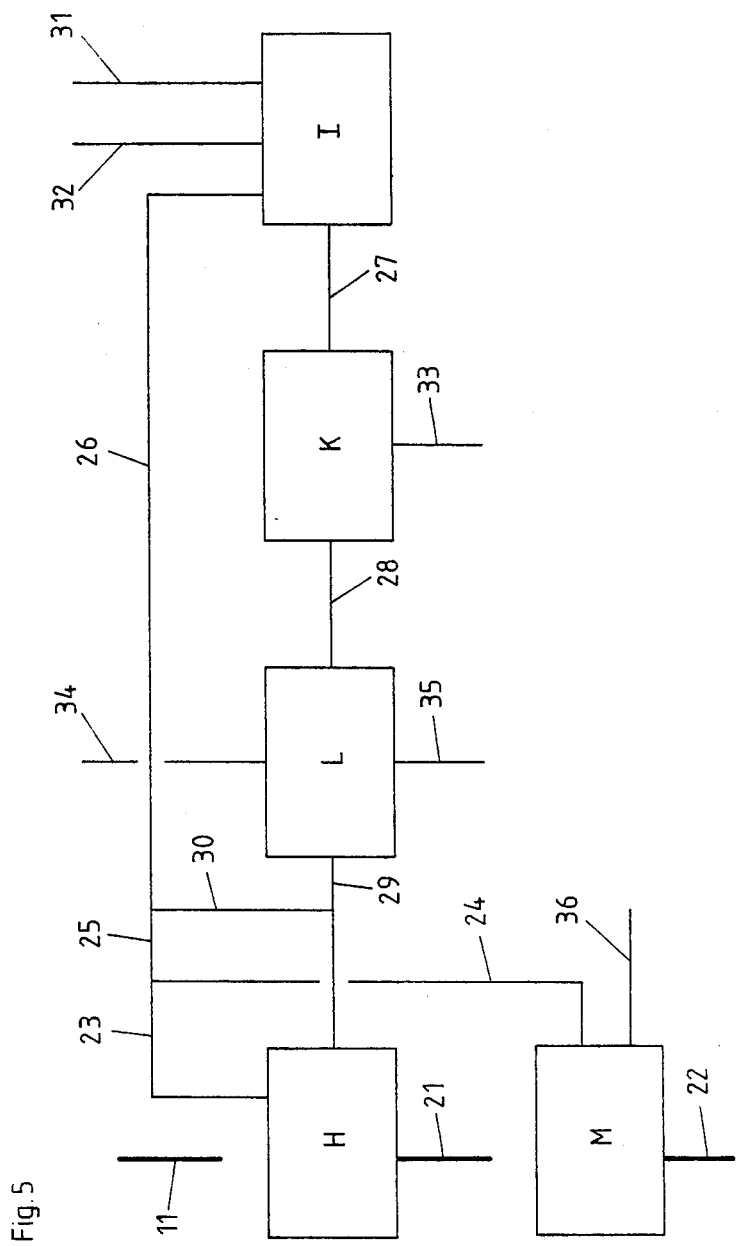
FIGS. 5 to 8 are block diagrams of acidic washes.

The embodiment schematically shown in FIG. 5 for effecting an acidic wash in conjunction with the first acidic flue gas scrubber of a two-stage flue gas scrubber is advantageously employed when only a slight scrubbing of the solids, shown as stream 11 and emanating from the alkaline washing stage as shown in FIGS. 1 to 4, is necessary and/or if the heavy metal concentration in tank I of the first flue gas scrubber is high.

The solid stream 21, which emerges from the first acidic washing stage H, enters the subsequent washing stage M and leaves the latter, in a cleaned form, as stream 22. The liquid streams 23 and 24 emerging from the washing stage H and from the subsequent washing stage M respectively, are combined to form a stream 25. A minor portion of such stream 25 is returned to the washing stage H through tank I of the first flue gas scrubber and, sequentially thereafter, through the mercury separation stage K and the heavy metal separation stage L. This transference is denoted by streams 26, 27, 28 and 29. The major portion of the stream 25 emerging from the washing stage H is returned directly to such washing stage as stream 30. The streams 31 and 32 denote, respectively the supply of the scrubbing liquor from the tank I to the first flue gas scrubber and the return thereof. A stream 33, which is rich in mercury, in conducted away from the mercury separation stage K, and waste water, in the form of stream 34, is conducted from the heavy metal separation stage L to a waste water processing plant. The heavy metal solution, that is to say, the heavy metal sludge, is conducted away in the form of stream 35. The subsequent washing stage M is supplied with fresh water in the form of stream 36. The relatively small circulatory amounts of water in the stream 26, 27 and 28 are advantageous in this example and permit smaller dimensioning of the stages K and L.

Figure 6:
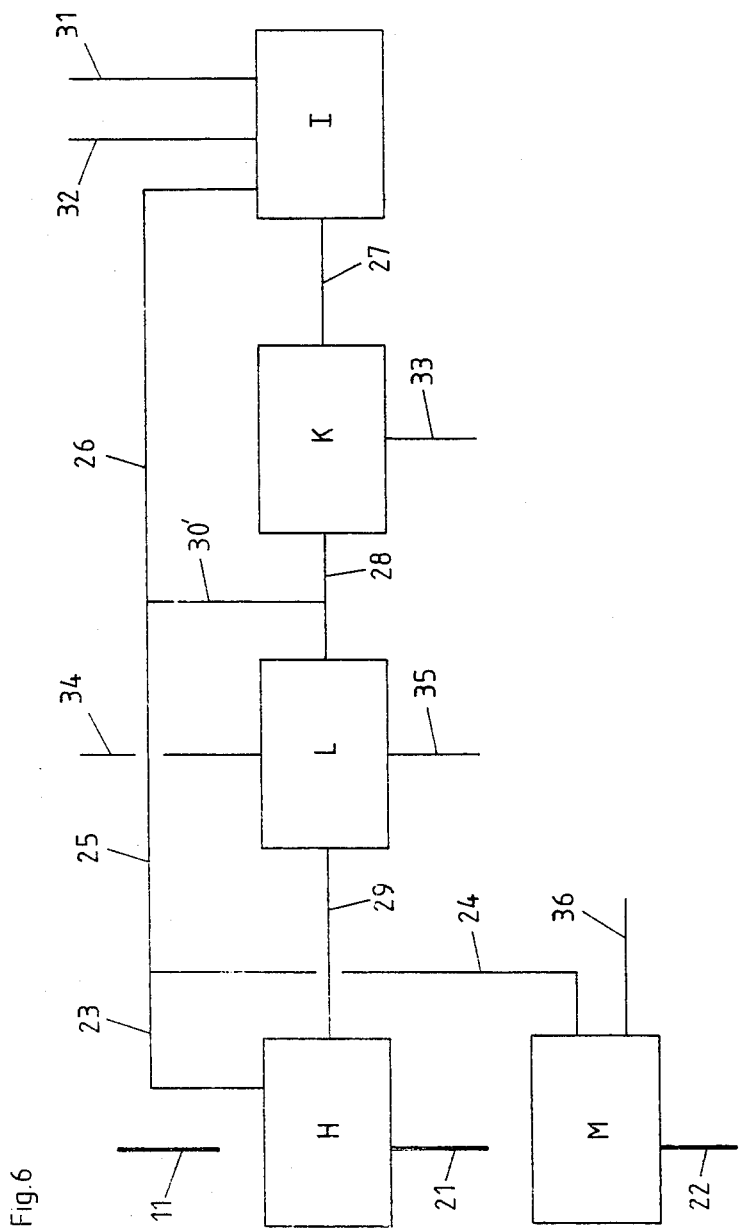

The example shown in FIG. 6 differs from that shown in FIG. 5 solely in that the major portion, shown as stream 30', of stream 25 is returned to the washing stage H through the intermediary of the heavy metal separation stage L. By so doing a higher degree of heavy metal removal can be achieved.

Figure 7:
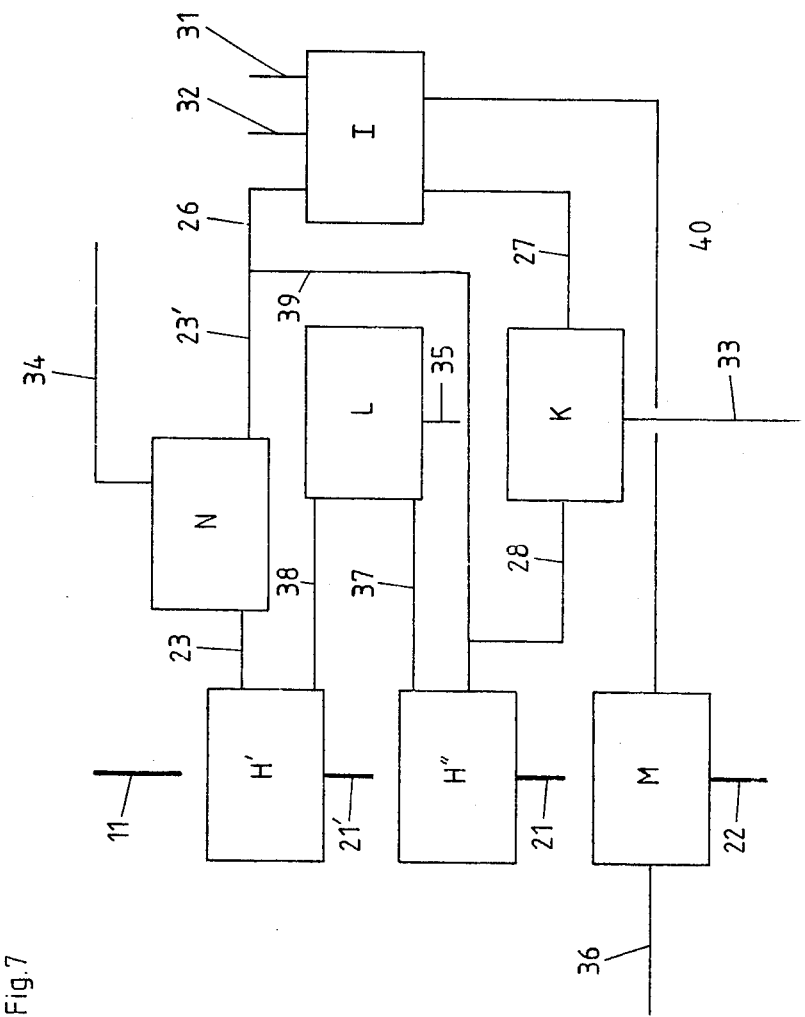

FIG. 7 shows an embodiment of a two-stage acidic wash, wherein the solids are conducted from a first washing stage H' in the form of a stream 21' to a second wash stage H'' in counterflow to the scrubbing liquor which is conducted from the second washing stage H'', in the form of stream 37, through the heavy metal separation stage L so as to emerge therefrom as stream 38, to the first washing stage H'. In such a case, a large proportion of the alkaline substances are removed in the first washing stage H', so that a low pH value then prevails in the second washing stage H''. Accordingly, more heavy metal ions can be brought into solution which heavy metals are then separated in the heavy metal separator L. A reverse osmosis stage N, having outlet streams 23' and 34, is additionally disposed between the first washing stage H' from which it is fed by stream 23 and the tank I. The purpose of such a reverse osmosis stage is to prevent malfunctioning caused by the salt concentrations in the circuit being too high. This is especially necessary when the operation is to be carried out free of waste water. The waste water emanating from the revese osmosis stage N in the form of stream 34 is then supplied to a waste water treatment plant or is evaporated. In order to keep the dimensions of the mercury separation stage K small, the major portion of the stream 23' is branched-off as stream 39 and is returned directly to the second washing stage H''. The water emanating from the subsequent washing stage M is returned to tank I as stream 40. The remaining streams, that is to say, those referenced 11, 21, 22, 27, 28 and 31 to 36 have the same signification and function as the streams identified with the same numerals in FIG. 5.

Figure 8:
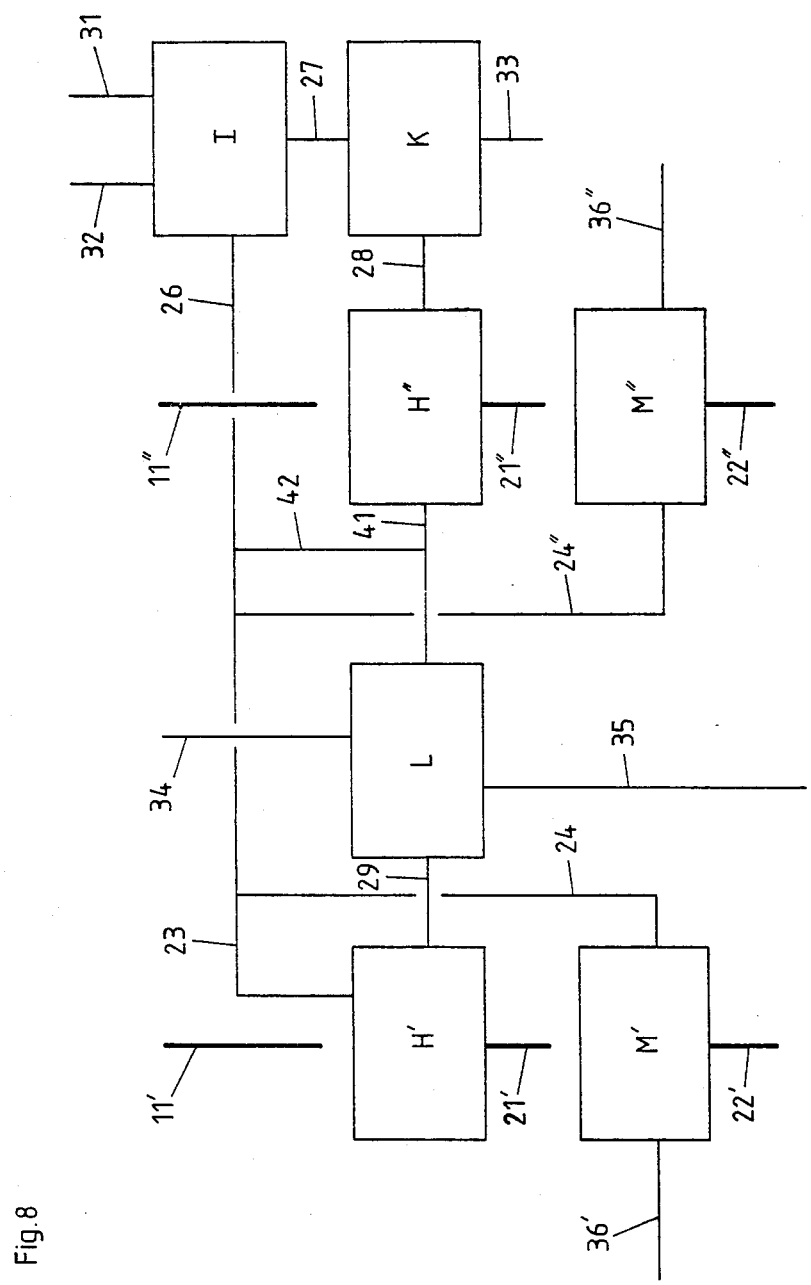

The embodiment shown in FIG. 8 provides the possibility of separate acidic treatment of ash and slag, the preceding alkaline treatment likewise being effected separately as shown in the FIG. 3 embodiment. The slag, shown as stream 11' and the ash, shown as stream 11'' are liberated of their soluble components in first and second washing stages H' and H'' respectively and are subsequently fed to subsequent washing stages M' and M'' as streams 21' and 21'' respectively for further washing. Because of the circulation of the scrubbing liquor—from tank I as stream 27 to the mercury separation stage K, then as stream 28 to the second washing stage H'' for the ash and followed by stream 41 to the heavy metal separation stage L, and stream 29 to the first washign stage H' from the slag and thence, as streams 23 and 26 back into Tank I—it is ensured that the more intensely contaminated ash is treated with the more acidic solution and, in consequence, it experiences more efficient leaching. The major portion of the stream 23 from the first washing stage H' is branched-off and mixed with the stream 41 to form stream 42. By so doing, the dimensioning of the mercury separation stage K can be reduced. If it is also wished to reduce the dimensions of the heavy metal separation stage and to increase the concentrations, stream 42 can be mixed with the stream 29 although this is not shown.

Fresh water streams 36' and 36'' are supplied to the subsequent washing stages M' and M'' respectively and are subsequently mixed, as streams 24' and 24'', with the stream 23. The solids leave the subsequent washing stages M', M'', as streams 22', 22'', in a cleaned state. The streams 31 to 35 are identical to the streams 31 to 35 which have already been described with reference to FIGS. 6 and 7.

Figure 9:
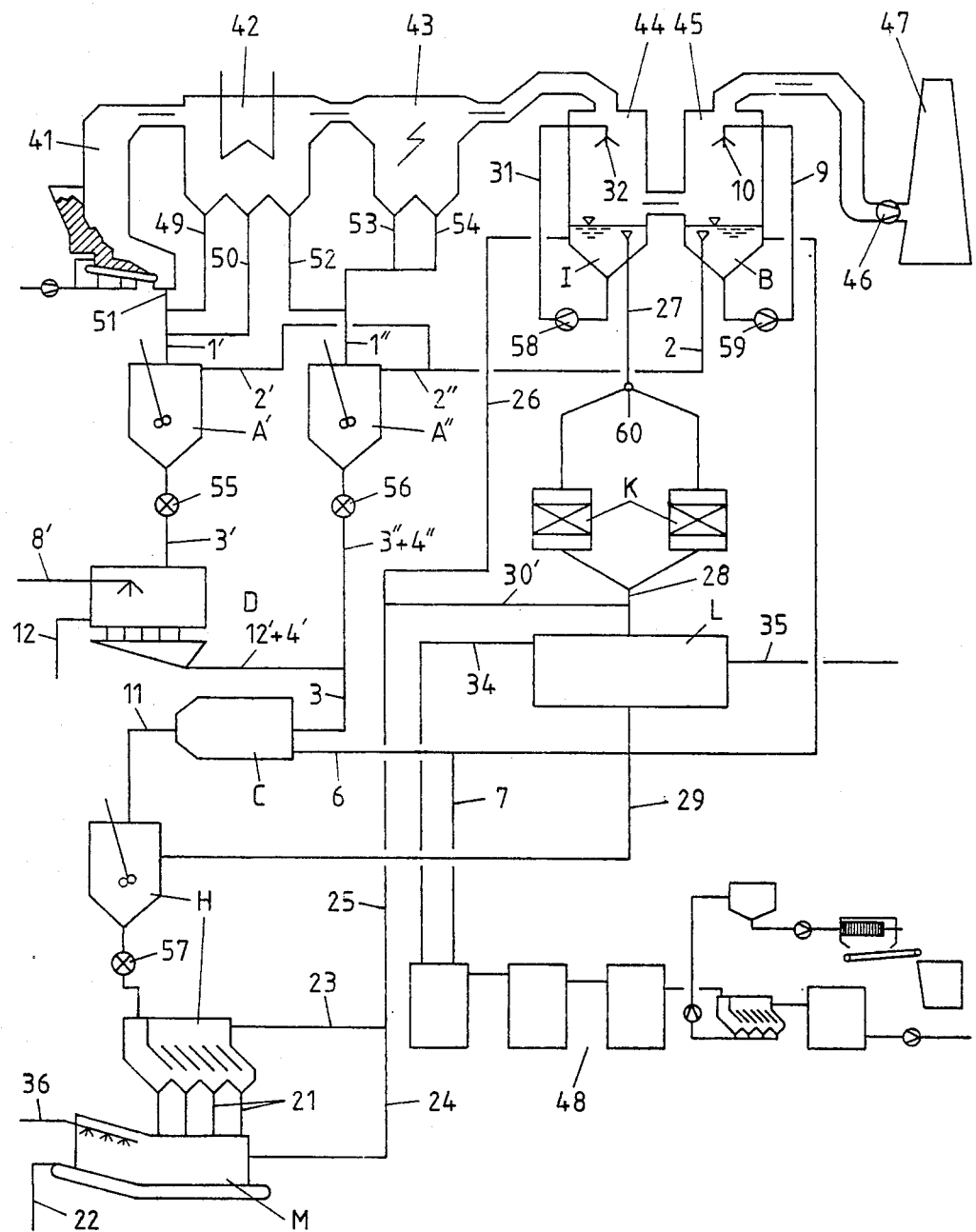
FIG. 9 is a block diagram of a complete plant with two flue gas scrubbers.

FIG. 9 shows, schematically the structural assembly of a waste incinerator having flue gas cleaning. The incinerator comprises a furnace 41, a waste-heat boiler 42, an electrofilter 43, a first flue gas wet scrubbing system 44 for HCl and HF, a second flue gas wet scrubbing system 45 for $SO_2$ a fan 4 and a chimney 47. The alkaline washing stage corresponds to that shown in FIG. 2 (but without individual streams 4', 4'', which flow to the dewatering stage C together with the streams 3'', 12' of the solids), and the acidic washing stage corresponds to the example shown in FIG. 6, wherein the same reference numerals are used as in these Figures, so that reference may be made to the description of FIGS. 2 and 6 in respect to the mode of operation. A waste water processing system is denoted by 48, but it is not explained in detail since it does not form part of the present invention.

After the flue gases have entered the waste-heat boiler 42, the ash streams 49 and 50 thus produced still have a relatively low heavy metals content, they can be combined with the slag stream 51 emanating from the furnace 41, in order to form the stream 1'. The ash produced before the flue gases have emerged from the waste-heat boiler 42 is in the form of stream 52 and is combined with the ash streams 53, 54 produced by the electrofilter 43, to form a combined stream 1''.

The discharge of the solids from the washing stages A', A'' and H is effected utilizing bucket-wheel sluices 55, 56 and 57. The pumps for the internal fluid circuit in the flue gas scrubbers 44 and 45 are denoted by 58 and 59 respectively.

The mercury separation stage K is redundant in this particular embodiment but two such stages are provided in parallel in the apparatus so that, at any one time, one can be in operation whilst the other is being regenerated. For this purpose, a changeover valve 60 is provided in the stream 27.

Hitherto, it has been assumed that, in a two-stage flue gas scrubber, both acidic and alkaline scrubbing liquor are used for scrubbing the solids. It is also possible, however, to use only the scrubbing liquor of one stage of a two-stage flue gas scrubber if one of the above-mentioned features, such as leaching of the heavy metals in a purely alkaline wash, is unnecessary or when the alkaline components in the solids are just sufficient to wash-out the acidic flue gas constituents occurring in a flue gas wet scrubbing stage.

Figure 10:
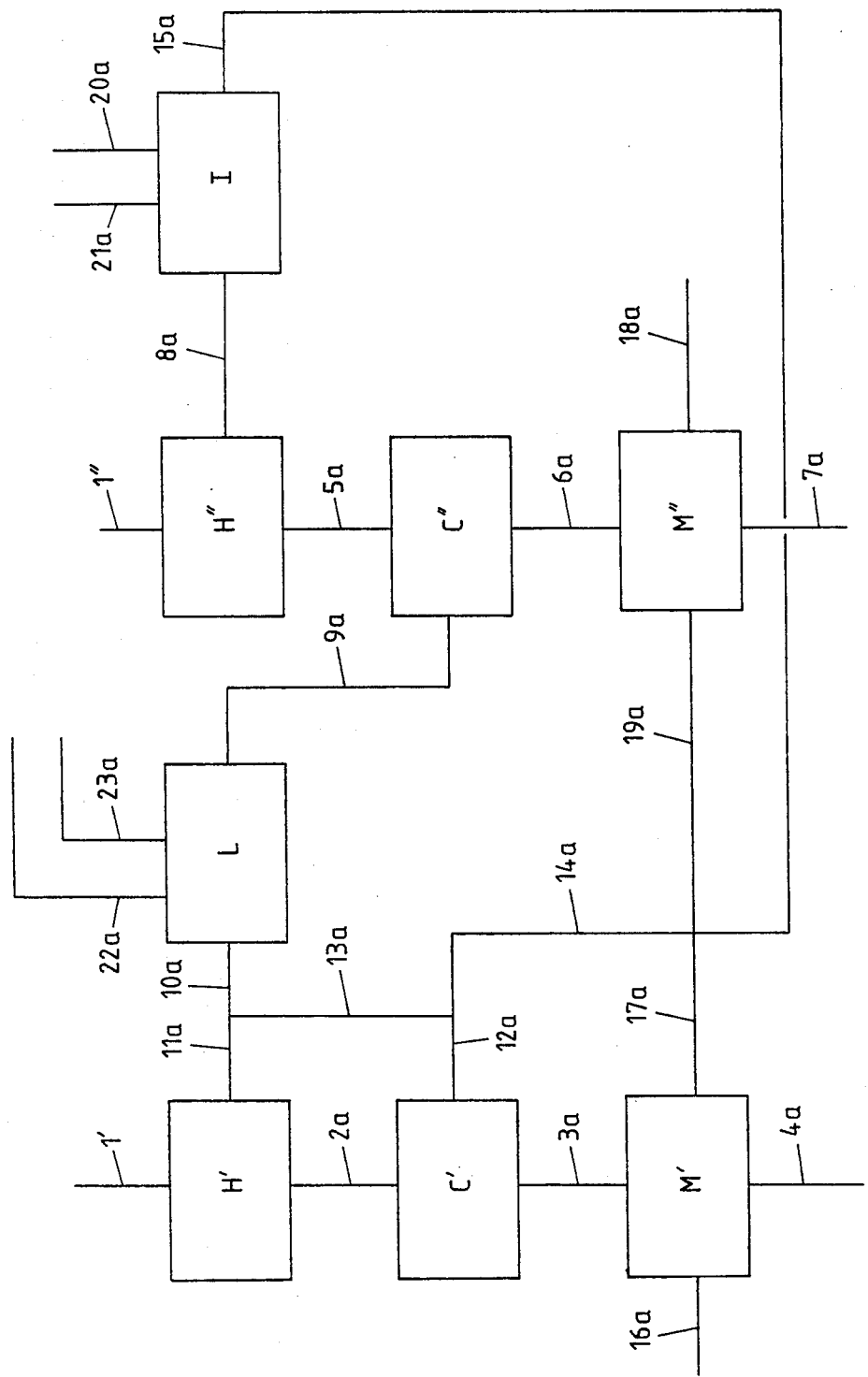
FIGS. 10 to 12 are block diagrams of washes with a single flue gas scrubber.
Figure 11:
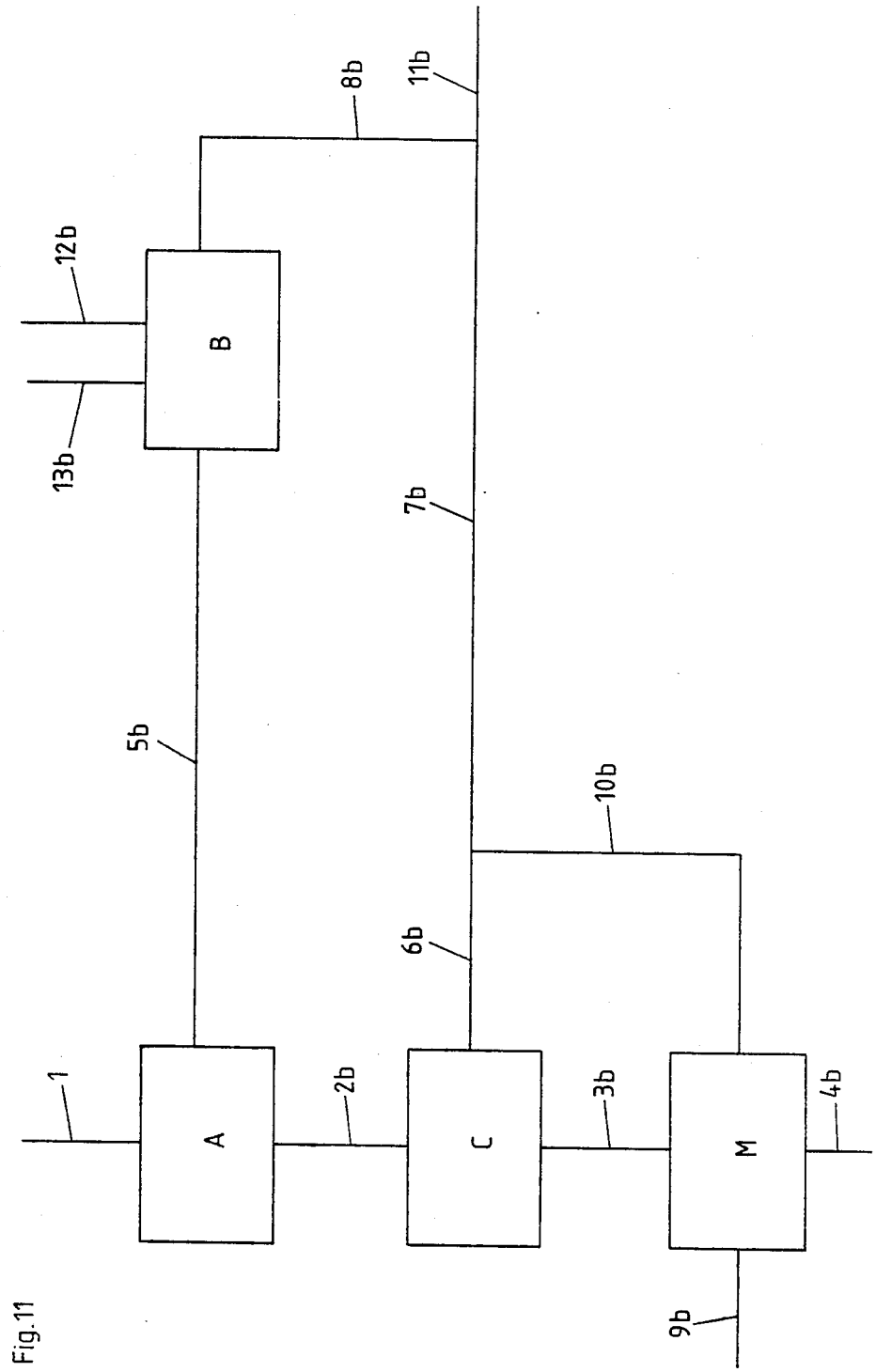
Figure 12:
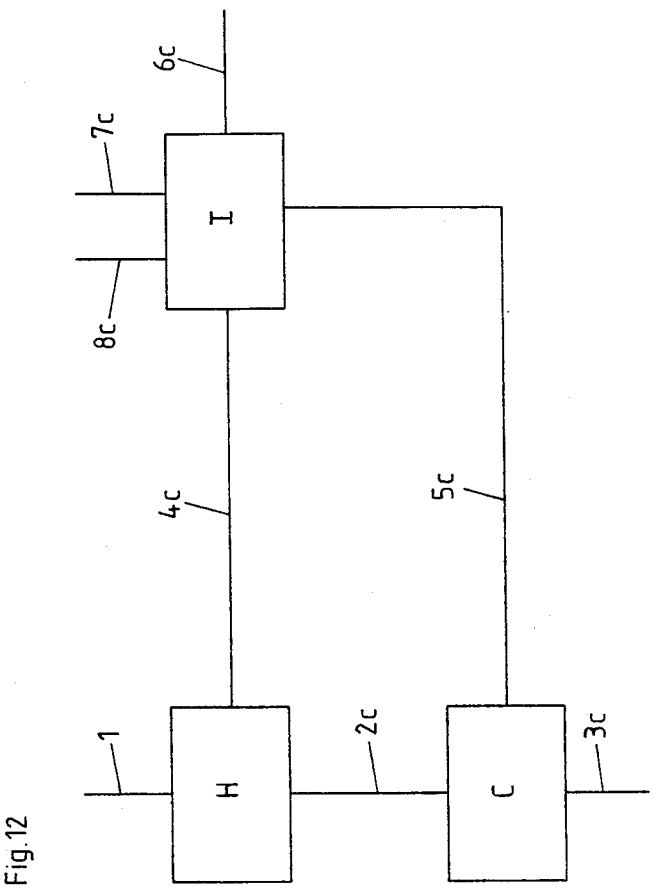

The embodiments shown in FIGS. 10 to 12 illustrate the method of the present invention in conjunction with a one-stage flue gas scrubber.

If the separation of sulphur dioxide from the flue gases can be omitted, the examples of the acidic washing stages described hereinbefore with reference to FIGS. 5 to 8 can be employed. However, care needs to be taken, in such circumstances, to ensure that more alkaline substances are introduced into the circuit and the contact times must, therefore, be kept shorter.

A further advantage of the method resides in the fact that the neutralization sludge, occurring during the waste-water processing can be re-supplied to the combustion without becoming enriched with heavy metals.

FIG. 10 shows an embodiment in which there is separate scrubbing of the slag, denoted by stream 1', and of the ash denoted by stream 1". The slag is mixed in an acidic washing stage H' with the circulating water designated as stream 11a, whereby the alkaline substances pass into solution. The slag and the water form a stream 2a which is transferred to a dewatering stage C' in the form of settling tank, an inclined clarifier, a filter or the like, where a thickening process occurs. The thickened suspension, now designated as stream 3a is subsequently washed in a subsequent wash stage M' which may be in the form of a sieve drum, or sprayed conveyor, and the wet slag leaves such stage as stream 4a and is in a substantially inert state. Similarly, the ash stream 1" is sequentially treated in the blocks H", C" and M" wherein the streams emerging from these blocks are designated 5a, 6a and 7a respectively. Appropriate treatment of the ash is additionally effected, in that the acidic scrubbing liquor in the form of stream 8a and emanating from tank I of the first flue gas scrubber is contacted directly with the ash, so that a particularly good extraction of heavy metal from the ash is effected.

The liquid stream 9a, produced in the dewatering stage C", is conducted to the heavy metal separation stage L which may be permeation stage, an extraction stage, or an ion exchanger, where the heavy metals are removed in the form of stream 23a. At the same time a stream 22a is discharged from the heavy metal separation stage to the waste water processor in order to prevent an enrichment of soluble substances in the circuit. A stream 13a is conducted in the circuit between the dewatering stage H' and the washing stage C', so that the dimensions of the remaining apparatuses can be reduced. Fresh water streams 16a and 18a supply water to the subsequent wash stages M' and M" and serve not only to wash out chloride ions from the liquid but also to replace the losses which are produced as a result of the discharge stream 22a and the amount of water which evaporates in cooling the hot flue gases. This latter is the difference in the amount of water in the supply stream 20a and the return stream 21a and to the tank I into the first flue gas scrubber. The streams 14a, 17a and 19a, emerging from the dewatering stage C' and the two subsequent washes M' and M", are returned to tank I as stream 15a.

The embodiment shown in FIG. 11 is suitable for use when a larger quantity of $SO_2$ is to be separated. In such embodiment the slag and ash, shown as a common stream 1, are treated together. The higher pH value which is necessary may be achieved by increasing the dwell-time in the washing stage A and by increasing the amount of circulation water. The solids pass from the washing stage A as stream 2b to the dewatering stage C and thence, as stream 3b, to the subsequent wash M, which they leave as stream 4b. The water, as stream 5b, passes from tank B and is conducted through the stages A and C so as to leave the latter as stream 6g. This is combined with the stream 10b from the dewatering stage M to form a stream 7b, part of which is returned to tank B as stream 8b, and the remainder forming the discharge stream 11b.

The fresh water supply, stream 9b, again serves to make up the losses caused by discharge and evaporation during the cooling of flue gases. The streams 12b and 13b denote the supply and return respectively of the scrubbing liquor from tank B to the flue gas scrubber. In this example, it is not appropriate to use a heavy metal separation stage because the heavy metal concentrations are low as a result of the high circulatory amounts.

The embodiment of FIG. 12 is suitable for use when no particular demands are made in respect to the quality of the solids, and when only a slight reduction in sulphur dioxide is necessary. In this case, the method can be carried out free of waste water, so that the soluble salts are discharged with the moisture of the solids.

The slag and ash are introduced as a combined stream 1 and are conducted through a washing stage H, leaving a stream 2c, and a dewatering stage C, leaving as stream 3c. The dewatering should not be too intensive—the moisture content being approximately 50 to 90% with respect to the total amount—so that sufficient salt-ladden water is discharged therewith. In such a case, a two-stage system is particularly suitable for dewatering purposes, where thickening occurs in the first stage, which may be a sieve drum, a lamellar inclined clarifier or a settling tank, and the thickened suspension is then emptied into containers or sacks which may be disposable and in which the water can be allowed to evaporate until such time as the solids have become dewatered to such an extent that they can be stored. Since the solids do not experience any improvement as a result of the wash, this example is suitable for use in plants which have only a slight incidence of residues which need to be stored separately, such as the ash and slag of hospital refuse.

The circulation water flows from tank I to the washing stage H as stream 4c and thence, together with the solids, to dewatering stage C as stream 2c. It then returns therefrom to tank I as stream 5c, while the solids are discharged in the stream 3c. The streams 7c and 8c denote the supply and return respectively of the scrubbing liquor from the tank I into the flue gas scrubber. Losses, resulting from the evaporation of water for the cooling of flue gases and from the moisture extracted from the solids, are compensated for by a fresh water stream 6c.

In the embodiments of FIGS. 10 to 12, a mercury separator, possibly in the form of an ion exchanger, may also be provided downstream of the tank of the flue gas washer. This is appropriate if it is undesirable for the solids to be charged with mercury. Alternatively, an appropriate means, such as an active carbon filter must be provided at the flue gas end.

Common to all of the embodiments of FIGS. 10 to 12 is the saving of alkaline material for neutralisation, whereby the expenditure on the operation is reduced.

Additional advantages are presented by the embodiment of FIG. 19, which are an improvement in the majority of the resultant residues and a reduction in the amount of residues, with recycling of the heavy metals by concentration being more likely.

In the embodiment of FIG. 11, the additional advantages of separation of HCl and $SO_2$ without a particularly large outlay in respect of apparatus is attained. In the embodiment of FIG. 12, a simple construction and a process which does not produce waste water are achieved.

In the illustrated embodiments, the most favourable locations for the removal of the discharge streams have been shown in each case; this removal can, however, in principle, be effected at any desired location in the circuit.

The return streams into the tank do not have to be combined to form a common stream. They can also be returned separately or in any desired combination.

We claim:

1. A method of treating flue gases and combustion residues from a combustion plant, comprising the steps of:
   providing a flue gas scrubber comprising a tank containing a scrubbing liquor;
   supplying at least one combustion residue selected from the group consisting of flue ash and slag to a washing zone;
   supplying scrubbing liquor having a pH of from 3 to 8 from said tank of said flue gas scrubber to said washing zone;
   washing the combustion residue with the scrubbing liquor in said washing zone to produce a washed mixture, whereby the acidity of the scrubbing liquor elutes alkaline constituents from the combustion residue;
   separating the washed mixture into a solid portion and a liquid portion;
   returning said liquid portion to said tank of said flue gas scrubber, said liquid portion having a pH of from 5 to 12; and
   wet-scrubbing flue gas with said liquid portion in said flue gas scrubber, thereby eluting acidic constituents from the flue gas.

2. A method according to claim 1, wherein said flue gas scrubber is a two-stage scrubber and said tank containing the scrubbing liquor in a second stage scrubbing liquor tank of said flue gas scrubber, and wherein said flue gas scrubber further comprises a first stage scrubbing liquor tank containing an acidic scrubbing liquor, the method further comprising the steps of:
   supplying said solid portion of the separated washed mixture to a second washing zone;
   supplying acidic scrubbing liquor from said first stage scrubbing liquor tank to said second washing zone, said acidic scrubbing liquor having a pH of from 0.5 to 4;
   washing said solid portion with the acidic scrubbing liquor in said second washing zone to produce a second washed mixture;
   returning a liquid portion of said second washed mixture to said first stage scrubbing liquor tank, said liquid portion of said second washed mixture having a pH of from 1 to 8; and
   wet-scrubbing flue gas with said liquid portion of said second washed mixture in a first stage of said flue gas scrubber prior to wet-scrubbing the flue gas with the liquid portion having a pH of from 5 to 12 in a second stage of said flue gas scrubber.

* * * * *